United States Patent [19]

Komai et al.

[11] 4,108,863

[45] Aug. 22, 1978

[54] COPPER PHTHALOCYANINE OF NOVEL CRYSTAL FORM

[75] Inventors: Atsushi Komai, Takatsuki; Naoyuki Shirane, Toyonaka; Yuji Ito, Amagasaki; Sadao Terui, Osaka; Michikazu Ninomiya, Kobe, all of Japan

[73] Assignee: Nippon Shokubai Kagaku Kogyo Co. Ltd., Osaka, Japan

[21] Appl. No.: 754,738

[22] Filed: Dec. 27, 1976

[30] Foreign Application Priority Data

Jan. 1, 1976 [JP] Japan ................................. 51-157

[51] Int. Cl.$^2$ ............................................. C09B 47/04
[52] U.S. Cl. ................................................. 260/314.5
[58] Field of Search ...................................... 260/314.5

[56] References Cited

U.S. PATENT DOCUMENTS

| Re. 27,117 | 4/1971 | Byrne et al. ........................ 260/314.5 |
| 3,051,721 | 8/1962 | Pfeiffer .............................. 260/314.5 |
| 3,150,150 | 9/1964 | Brand ................................. 260/314.5 |
| 3,160,635 | 12/1964 | Knudsen et al. ................... 260/314.5 |
| 3,708,292 | 1/1973 | Brach et al. ........................ 260/314.5 |
| 3,708,293 | 1/1973 | Brach et al. .................... 260/314.5 X |
| 3,897,450 | 7/1975 | Horiguchi et al. ................. 260/314.5 |

*Primary Examiner*—Richard L. Raymond
*Attorney, Agent, or Firm*—Sherman & Shalloway

[57] ABSTRACT

Copper phthalocyanine of a novel crystal form which by measurement using CuKᾱ radiation of λ = 1.5418 A.U. shows an X-ray diffraction pattern having peaks at Bragg's angles 2θ equal to about 8.6°, 17.2°, 18.3°, 23.2°, 25.3°, 26.5°, and 28.8°.

1 Claim, 10 Drawing Figures

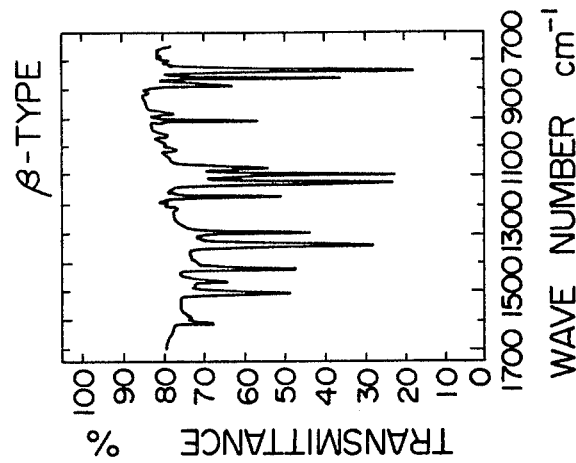
Fig. 1 ρ-TYPE
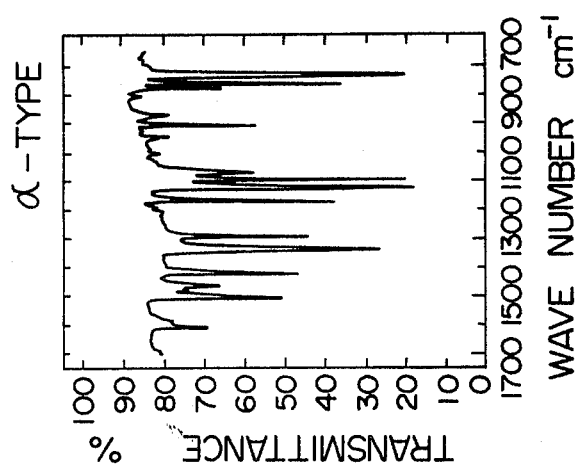
Fig. 2 α-TYPE
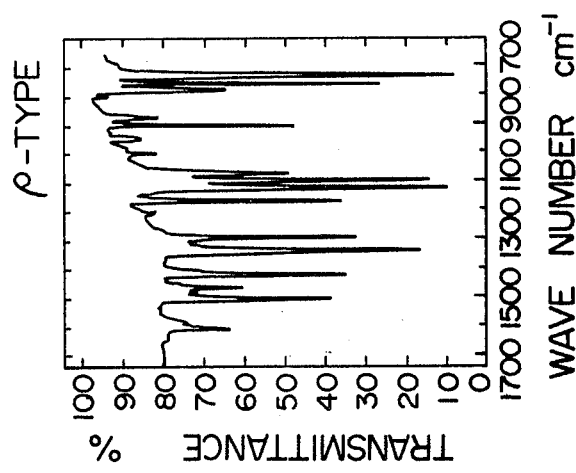
Fig. 3 β-TYPE

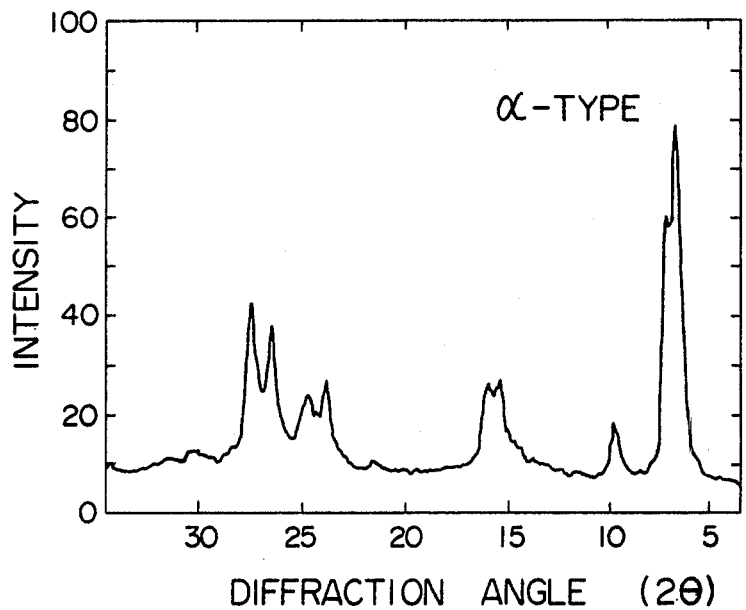
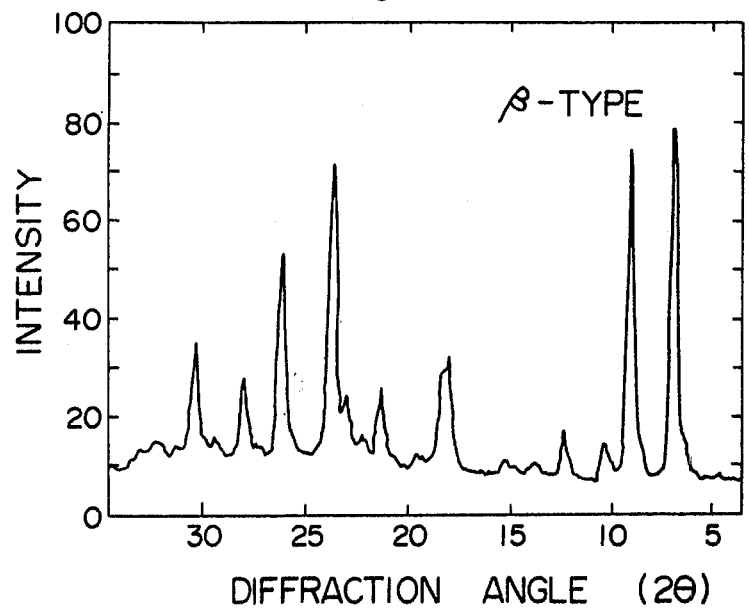

COPPER PHTHALOCYANINE OF NOVEL CRYSTAL FORM

This invention relates to copper phthalocyanine having a novel crystal form.

Copper phthalocyanine is highly evaluated and widely used in the pigment and other color industries and other fields because of its valuable properties such as beautiful color shade, high tinting strength and superior fastness to heat, chemical resistance and weatherability.

Copper phthalocyanine is a polymorphism, and various crystal forms such as $\alpha$, $\beta$, $\gamma$, $\delta$, $\pi$ and $\chi$ types, have been known.

$\alpha$-Type copper phthalocyanine is a reddish blue crystal which by measurement using CuK$\bar{\alpha}$ radiation of $\lambda$ = 1.5418 A.U., shows an X-ray diffraction pattern having peaks at Bragg's angles $2\theta$ equal to about 6.8°, 7.2°, 9.9°, 15.5°, 16.2°, 24.0°, 24.9°, 26.6° and 27.5°. It has the property of being easily converted to stable $\beta$-type copper phthalocyanine in aromatic solvents. Copper phthalocyanine of this crystal form has been used widely as pigments.

$\beta$-Type copper phthalocyanine is a greenish blue crystal which by measurement using CuK$\bar{\alpha}$ radiation of $\lambda$ = 1.5418 A.U., shows an X-ray diffraction pattern having peaks at Bragg's angles $2\theta$ equal to about 7.0°, 9.2°, 10.5°, 12.5°, 18.1°, 18.5°, 21.3°, 23.0°, 23.8°, 26.2°, 28.0°, and 30.4°. It is known as very stable copper phthalocyanine which is resitant to changes even in aromatic solvents. Copper phthalocyanine of this crystal form is also used widely as pigments.

$\gamma$-Type copper phthalocyanine, according to U.S. Pat. No. 3,160,635, is characterized by an X-ray diffraction pattern having peaks at Bragg's angles $2\theta$ equal to about 6.5°, 7.4°, 9.7°, 10.4°, 15.9°, 21.3°, 23.8°, 24.9°, 26.3°, 27.7° and 30.3°. Copper phthalocyanine of this crystal form is a blue crystal having a lighter shade than the $\alpha$-type copper phthalocyanine, and has the property of being easily converted to stable $\beta$-type crystal in aromatic solvents (see Journal of Chemical Laboratory for Industry, Tokyo, Vol. 62, No. 6, pages 195–201).

U.S. Pat. No. 3,160,635 further discloses that $\delta$-type copper phthalocyanine is a reddish blue crystal which shows an X-ray diffraction pattern having peaks at Bragg's angles $2\theta$ equal to about 7.4°, 9.2°, 11.4°, 14.2°, 17.1°, 17.5°, 20.6°, 21.3°, 21.8°, 23.6°, 25.9°, 27.5°, 28.7° and 30.1°.

U.S. Pat. No. 3,708,292 discloses that $\pi$-type copper phthalocyanine is characterized by an X-ray diffraction pattern having peaks at Bragg's angles $2\theta$ equal to about 5.1°, 8.8° and 10.0°, and is suitable for use in electrophotographic image-forming systems.

U.S. Pat. No. 3,708,292 discloses that $\chi$-type copper phthalocyanine is characterized by an X-ray diffraction pattern having peaks at Bragg's angles $2\theta$ equal to about 7.7° and 9.5°, and has superior photoconductivity.

Thus, copper phthalocyanine is available in various crystal forms, and its stability to solvents, shade and other properties and its uses differ according to differences in crystal form.

The present invention provides copper phthalocyanine having a novel crystal form which differs from any of those reported in the above-cited literature references. The new crystal-type copper phthalocyanine has a more reddish unique shade than the conventional $\alpha$-type copper phthalocyanine, and is commercially valuable.

In the present application, the copper phthalocyanine of the new crystal form is termed "$\rho$-type copper phthalocyanine".

The $\rho$-type copper phthalocyanine of this invention is characterized by an X-ray diffraction pattern having peaks at Bragg's angles $2\theta$ equal to about 8.6°, 17.2°, 18.3°, 23.2°, 25.3°, 26.5° and 28.8° by measurement using CuK$\bar{\alpha}$ radiation of $\lambda$ = 1.5418 A.U.

In the accompanying drawings,

FIG. 1 is an infrared absorption spectral chart of $\rho$-type copper phthalocyanine;

FIG. 2 is an infrared absorption spectral chart of $\alpha$-type copper phthalocyanine;

FIG. 3 is an infrared absorption spectral chart of $\beta$-type copper phthalocyanine;

FIG. 4 is an X-ray diffraction pattern of $\alpha$-type copper phthalocyanine;

FIG. 5 is an X-ray diffraction pattern of $\beta$-type copper phthalocyanine;

Figure 6:
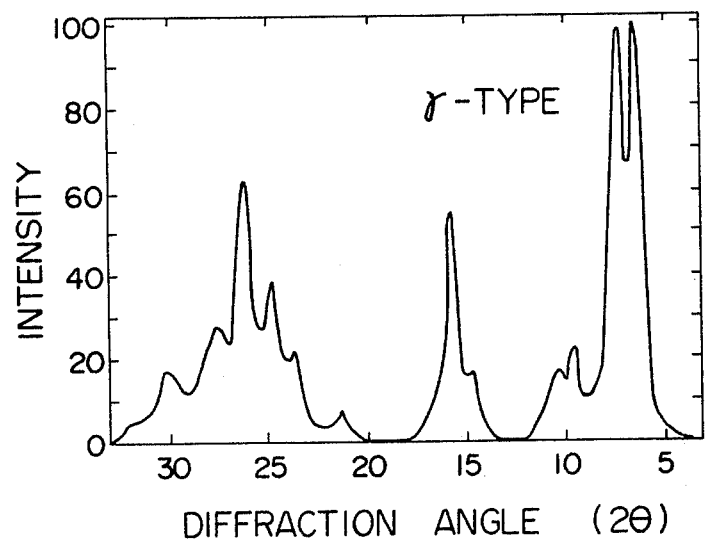
FIG. 6 is an X-ray diffraction pattern of $\gamma$-type copper phthalocyanine.
Figure 7:
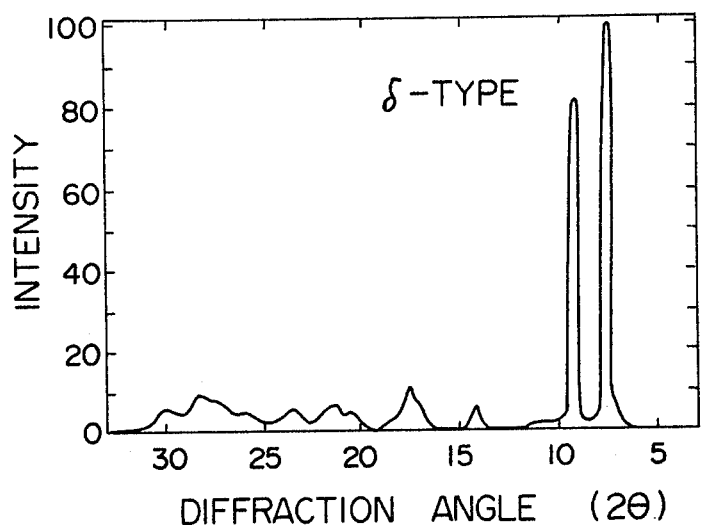
FIG. 7 is an X-ray diffraction pattern of $\delta$-type copper phthalocyanine.
Figure 8:
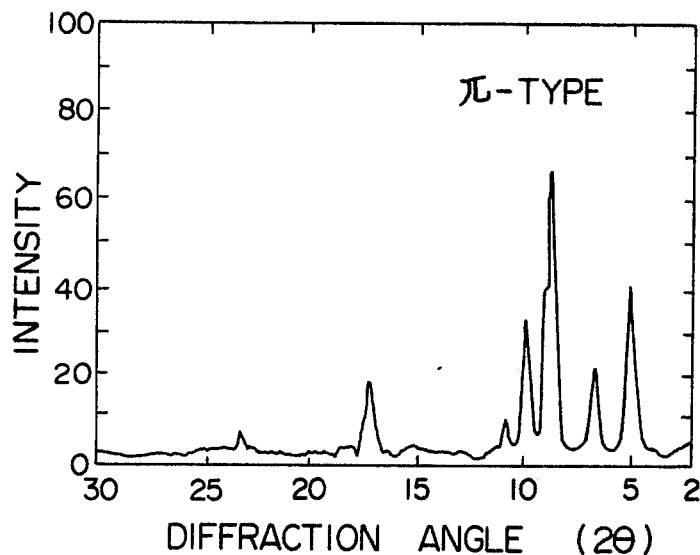
FIG. 8 is an X-ray diffraction pattern of $\pi$-type copper phthalocyanine.
Figure 9:
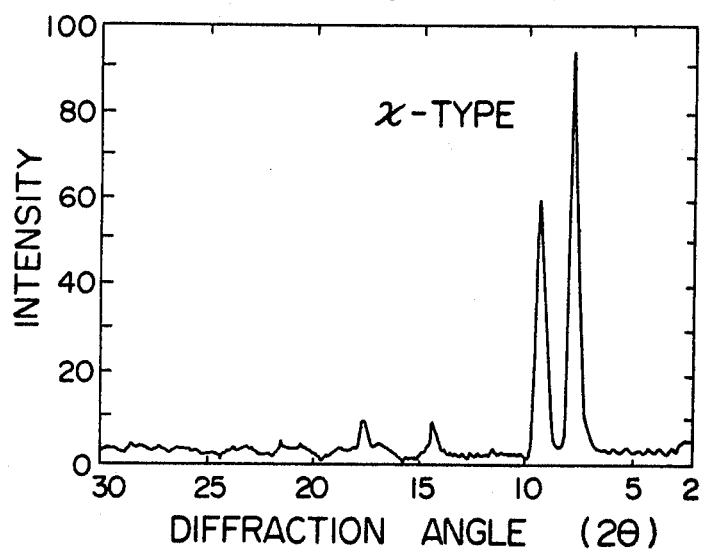
FIG. 9 is an X-ray diffraction pattern of $\chi$-type copper phthalocyanine.

It is clear from elemental analysis data, infrared absorption spectroscopic data and other properties measured that the substance in accordance with this invention is copper phthalocyanine.

The analysis values found of the product in Example 1 to be given hereinbelow are Cu:10.92%, C:67.00%, H:2.83%, N:19.42% which substantially correspond to the calculated values for copper phthalocyanine (Cu:11.03%, C:66.72%, H:2.80%, N:19.45%).

A strict examination of FIG. 1 in comparison with FIGS. 2 and 3 shows that the infrared absorption spectrum of the substance in accordance with this invention is much the same as those of the $\alpha$-type and $\beta$-type copper phthalocyanines although some differences are seen in absorption wave number and intensity.

When this substance is pigmented by an acid pasting method using conc. sulfuric acid, copper phthalocyanine showing an X-ray diffraction pattern of the conventional $\alpha$-type copper phthalocyanine is obtained. When it is boiled in an aromatic solvent such as benzene or toluene, copper phthalocyanine showing an X-ray diffraction pattern of the known $\alpha$-type is obtained.

These results demonstrate that this substance is copper phthalocyanine.

A comparison of the X-ray diffraction pattern of this substance (FIG. 10) with those of phthalocyanines of known crystal forms (FIGS. 4 to 9) shows that the copper phthalocyanine in accordance with this invention has quite a novel crystal form. The diffraction angles $2\theta$ of various types of copper phthalocyanine are shown in Table 1.

Table 1

| Crystal forms | | | | | | |
|---|---|---|---|---|---|---|
| $\alpha$ | $\beta$ | $\gamma$ | $\delta$ | $\pi$ | $\chi$ | $\rho$ |
| 6.8 | 7.0 | 6.5 | 7.4 | 5.1 | 7.7 | 8.6 |
| 7.2 | 9.2 | 7.4 | 9.2 | 8.8 | 9.5 | 17.2 |
| 9.9 | 10.5 | 9.7 | 11.4 | 10.0 | | 18.3 |

Table 1-continued

| | Crystal forms | | | | | | |
|---|---|---|---|---|---|---|---|
| | α | β | γ | δ | π | χ | ρ |
| 2θ (°) | 15.5 | 12.5 | 10.4 | 14.2 | | | 23.2 |
| | 16.2 | 18.1 | 15.9 | 17.1 | | | 25.3 |
| | 24.0 | 18.5 | 21.3 | 17.5 | | | 26.5 |
| | 24.9 | 21.3 | 23.8 | 20.6 | | | 28.8 |
| | 26.6 | 23.0 | 24.9 | 21.3 | | | |
| | 27.5 | 23.8 | 26.3 | 21.8 | | | |
| | | 26.2 | 27.7 | 23.6 | | | |
| | | 28.0 | 30.3 | 25.9 | | | |
| | | 30.4 | | 27.5 | | | |
| | | | | 28.7 | | | |
| | | | | 30.1 | | | |

Referring to the X-ray diffraction charts of FIGS. 4 to 10 and the diffraction angles shown in Table 1, it should be noted that those of the α-, β- and ρ-type copper phthalocyanines were measured using CuKα radiation of λ = 1.5418 A.U. on samples synthesized by the present inventors; those of the γ-type and δ-type copper phthalocyanines are described in U.S. Pat. No. 3,160,635; and those of the π-type and χ-type copper phthalocyanines are described in U.S. Pat. No. 3,708,292.

FIGS. 4 to 10 and Table 1 show that ρ-type copper phthalocyanine has a crystal form different from those of the conventional copper phthalocyanines. The ρ-type copper phthalocyanine shows a strong peak at a Bragg's angle 2θ equal to 8.6°, medium peaks at 2θ equal to 17.2°, 18.3° and 23.2°, and also some medium peaks at 2θ equal to 25° - 30°. In contrast, the α-, β-, γ-, δ- and χ-type copper phthalocyanines do not at all show a peak at a Bragg's angle 2θ equal to 8.6°.

The π-type copper phthalocyanine shows a strong peak at 2θ equal to 8.8°, which is different from the peak of the π-type copper phthalocyanine. Moreover, the former shows strong peaks also at 5.1° and 10.0°, whereas the latter shows a very weak peak at about 5° which is only trace, and does not show any peak at 10°. Furthermore, the ρ-type copper phthalocyanine shows medium peaks at 18.3° and 25° - 30°, whereas the π-type copper phthalocyanine does not show a peak at 18.3°, and shows scarcely any peak at 25° - 30°.

The ρ-type copper phthalocyanine is unstable to aromatic solvents in view of the fact that it is easily converted to the β-type crystal when boiled in benzene or toluene. On the other hand, it is reported that the π-type copper phthalocyanine is completely stable even after having been treated for 96 hours in refluxing benzene at 78° C. This fact clearly shows that the ρ-type copper phthalocyanine has a different crystal form from the π-type copper phthalocyanine.

The characteristic of the ρ-type copper phthalocyanine having this novel crystal form is that it has a unique superior color shade. It is a reddish blue in shade and has a high degree of purity. The color is more reddish than α-type copper phthalocyanine. In recent years, there has been a strong demand for pigments having vivid reddish blue. The ρ-type copper phthalocyanine having such a novel crystal form can meet this demand, and is very useful as pigments for use in textile printing, resin coloring, and printing inks.

For example, as will be shown in Examples given hereinbelow, a polyvinyl chloride resin colored with ρ-type copper phthalocyanine assumes a unique beautiful blue which is more vivid and reddish than a polyvinyl chloride resin colored with α-type copper phthalocyanine. Moreover, the ρ-copper phthalocyanine has excellent light fastness, weatherability and heat resistance.

The following Examples illustrate the present invention in greater detail.

1-Amino-3-imino-isoindolenine used as a raw material in these Examples was obtained by reacting 250 parts by weight of phthalonitrile, 400 parts by weight of methanol, 10 parts of sodium methylate and 50 parts by weight of ammonia in an autoclave at 70° to 80° C. for 6 hours, cooling the reaction mixture to room temperature, filtering it, washing the filtration cake with methanol, drying it, and pulverizing it by a pulverizer until its size became not larger than 150 mesh. The 1-amino-3-imino-isoindolenine has a purity of more than 98%.

EXAMPLE 1

A 300 cc three-necked cylindrical round-bottom flask (with an inside diameter of 75 mm and a height of 80 mm) equipped with an anchor-type stirrer (vane width 7 mm, vane length 65 mm, vane height 50 mm), a condenser and a thermometer was charged with 150 g of ethylene glycol and 8.4 g of anhydrous calcium chloride. They were stirred for a while to dissolve the anhydrous calcium chloride, and the 30 g of 1-amino-3-imino-isoindolenine and 10.2 g of copper acetate monohydrate pulverized to a size smaller than 32 mesh were added. With stirring at a speed of about 220 rpm, the mixture was heated to 75° C. over the course of about 30 minutes. The mixture was reacted at 75° C. for 8 hours, and then at 110° C. for 2 hours.

After the reaction, the reaction mixture was cooled, filtered, and washed with methanol. The filtration cake was boiled with a 2% aqueous solution of hydrochloric acid, filtered, washed thoroughly with water, and dried at 90° C. in a vacuum dryer. A vivid blue product was obtained in a yield of about 80%.

Figure 10:
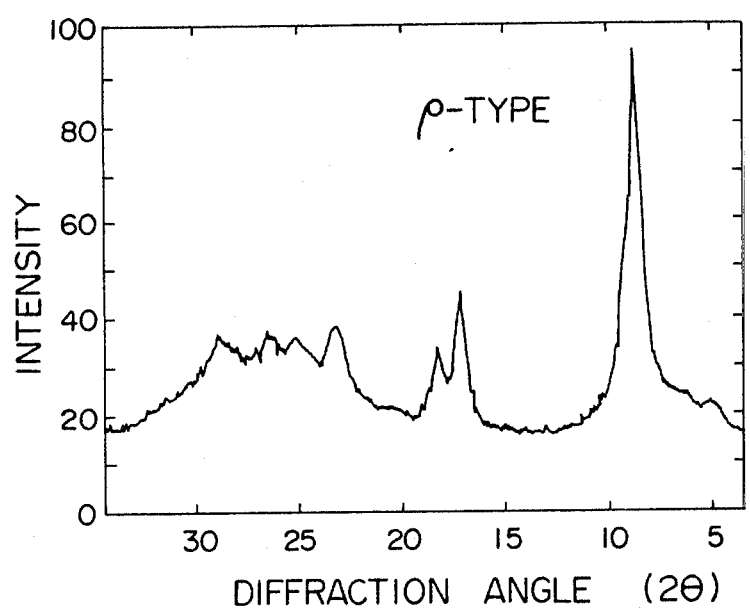
FIG. 10 is an X-ray diffraction pattern of $\pi$-type copper phthalocyanine.

The elemental analysis values of this product as found were Cu:10.92, C:67.00, H:2.83, N:19.42, % by weight. The infrared absorption spectroscopy of this product afforded an infrared absorption spectral chart shown in FIG. 1. Analysis of this product using CuKα radiation of λ = 1.5418 A.U. afforded an X-ray diffraction pattern having peaks at Bragg's angles 2θ equal to about 8.6°, 17.2°, 18.3°, 23.2°, 25.3°, 26.5° and 28.8°, as shown in FIG. 10.

EXAMPLE 2

The same 300 cc three-necked flask as used in Example 1 was charged with 150 g of ethylene glycol and 8.4 g of anhydrous calcium chloride. They were stirred for a while to dissolve the anhydrous calcium chloride, and 30 g of 1-amino-3-imino-isoindolenine and 10.2 g of copper acetate monohydrate pulverized to a size smaller than 32 mesh were added. With stirring, the mixture was heated to 75° C. over the course of about 30 minutes, and reacted at 75° C. for 14 hours. After the reaction, the reaction mixture was worked up in the same way as in Example 1 to afford a vivid blue product in a yield of 81%.

This product was found to be ρ-type copper phthalocyanine which by measurement using CuKα radiation of λ = 1.5418 A.U., showed an X-ray diffraction pattern having peaks at Bragg's angles 2θ equal to about 8.6°, 17.2°, 18.3°, 23.2°, 25.3°, 26.5° and 28.8°.

EXAMPLE 3

The same 300 cc three-necked flask as used in Example 1 was charged with 120 g of ethylene glycol and 5.6 g anhydrous calcium chloride. They were stirred for a while to dissolve the anhydrous calcium chloride, and then 30 g of 1-amino-3imino-isoindolenine and 9.6 g of copper acetate monohydrate pulverized to a size smaller than 32 mesh were added. With stirring, the mixture was heated to 75° C. over the course of about 30 minutes, and reacted at 75° C. for 12 hours. After the reaction, the reaction mixture was worked up in the same way as in Example 1 to afford a vivid blue product in a yield of 83%.

This product afforded an X-ray diffraction pattern having peaks at Bragg's angles $2\theta$ equal to about 8.6°, 17.2°, 18.3°, 23.2°, 25.3°, 26.5° and 28.8° by measurement using CuK$\overline{\alpha}$ radiation of $\lambda$ = 1.5418 A.U., and was determined to be $p$-type copper phthalocyanine.

EXAMPLE 4

In this Example, the particle size, dispersibility and color the $p$-type copper phthalocyanine obtained in Example 1 were tested.

1. Measurement of particle size

The measurement was made by means of an electron microscope. It was found that $p$-type copper phthaloycanine consisted of very fine particles each having a long diameter of about 0.05 to 0.2 micron and a short diameter of about 0.02 to 0.05 micron, and the range of particle size distribution was narrow.

2. Dispersibility test 0.5 of $p$-type copper phthalocyanine and 1 g of a printing varnish (No. 4) were ground by a Hoover muller under a load of 150 pounds (100 revolutions × three cycles). The paste obtained was placed on a grind meter (0 – 25 microns), and spread by a scraper. No scratch occurred. This indicates that the $p$-type copper phthalocyanine was very soft and easily dispersible.

3. Color test 0.5 g of $p$-type copper phthalocyanine and 1 g of a printing varnish (No. 4) were ground by a Hoover muller under a load of 150 pounds (100 revolutions × three cycles). Separately, $\alpha$-type copper phthanlocyanine produced by an acid pasting method was worked up in the same way as above. The resulting two kinds of pastes were spread in juxtaposition on a sheet of white paper, and compared with regard to mass tone and under tone. It was seen that the paste of the $p$-type cooper phthalocyanine was of a blue color which was far more reddish than the paste of $\alpha$-type copper phthalocyanine, and the color was darker and more vivid and beautiful than the latter.

Then, 0.1 g of $p$-type copper phthalocyanine, 2.0 g of titanium oxide and 1 g of a boiled linseed oil were ground by a Hoover muller under a load of 150 pounds (100 revolutions × three cycles). The resulting paste was spread by a steel spatula to a thickness of about 0.2 mm on a sheet of clean white thick paper. Separately, $\alpha$-type copper phthalocyanine produced by an acid pasting method was worked up in the same way. The resulting two kinds of coated sheets were dried, and then the dominant wavelengths, excitation purities and lightnesses of the coated surfaces were determined by a spectrophotometer. The results are shown in Table 2.

Table 2

|  | Dominant wavelength ($\lambda$d; m$\mu$) | Excitation purity (Pe; %) | Lightness (Y; %) |
|---|---|---|---|
| $p$-type | 477.4 | 60.5 | 16.5 |
| $\alpha$-type | 478.3 | 58.2 | 19.9 |

Table 2 shows that the $p$-type copper phthalocyanine is vivid and more reddish than $\alpha$-type copper phthalocyanine. Visual observation also showed that the sample using $p$-type copper phthalocyanine had a unique blue color which was more reddish than the $\alpha$-type copper phthalocyanine.

EXAMPLE 5

In this Example, a coloration test was performed using a polyvinyl chloride resin.

0.1 g of the $p$-type copper phthalocyanine obtained in Example 1, 50 g of polyvinyl chloride, 30 g of dioctyl phthalate, 1 g of calcium stearate, 0.5 g of di-n-butyltin maleate, and 0.5 g of di-n-butyltin dilaurate were kneaded on a roll mill at 145° C. for 10 minutes, and then molded for 1 minute at a pressure of 100 kg/cm$^2$ and a temperature of 175° C. to afford a blue-colored sheet having a thickness of 0.94 mm. Separately, the above operation was repeated using $\alpha$-type copper phthalocyanine produced by an acid pasting method.

The reflection color and transmission color of the resulting two kinds of sheet were measured by a spectrophotometer. The results are shown in Table 3.

Table 3

|  |  | Dominant wavelength ($\lambda$d; m$\mu$) | Excitation purity (Pe; %) | Lightness (Y; %) |
|---|---|---|---|---|
| Reflection color | $p$-type | 471.6 | 87.9 | 3.2 |
|  | $\alpha$-type | 474.4 | 79.5 | 3.6 |
| Transmission color | $p$-type | 475.4 | 89.3 | 8.5 |
|  | $\alpha$-type | 478.1 | 87.8 | 7.2 |

Table 3 shows that the sheet colored with $p$-type copper phthalocyanine was colored blue with much more vividness and reddish tone than the sheet colored with the $\alpha$-type copper phthalocyanine. Visual observation also showed that the sheet colored with the $p$-type copper phthalocyanine was colored unique beautiful blue with much more vividness and reddishness than the sheet colored with the $\alpha$-type copper phthalocyanine both in reflection color and transmission color.

What we claim is:

1. Copper phthalocyanine of a novel crystal form which by measurement using CuK$\overline{\alpha}$ radiation of $\lambda$ = 1.5418 A.U. shows an X-ray diffraction pattern having peaks at Bragg's angles $2\theta$ equal to about 8.6°, 17.2°, 18.3°, 23.2°, 25.3°, 26.5°, and 28.8°.

* * * * *